Patented Feb. 1, 1927.

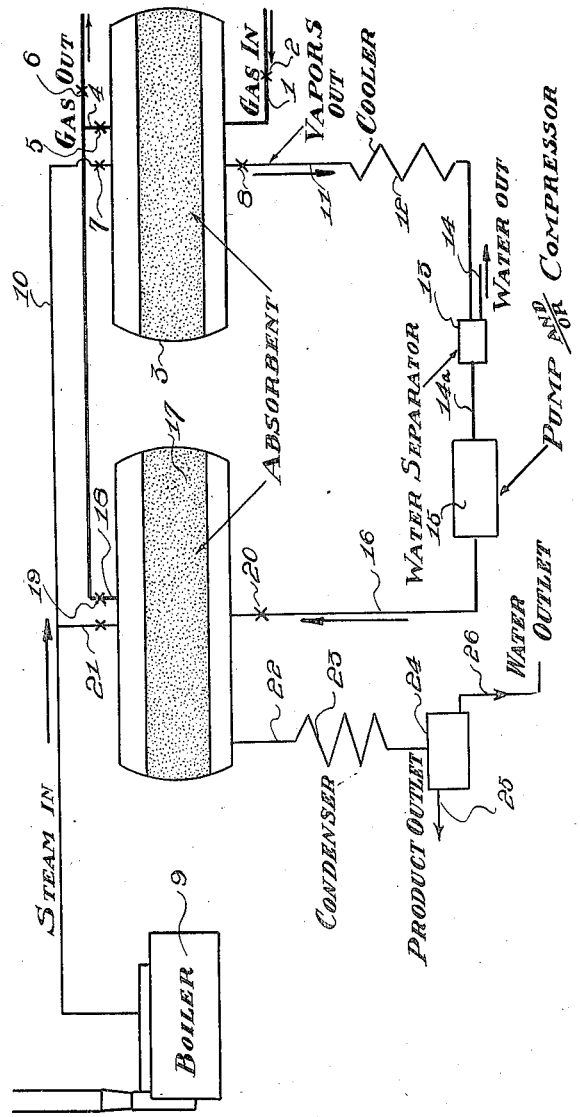

1,616,242

UNITED STATES PATENT OFFICE.

CLYDE L. VORESS AND NELSON C. TURNER, OF CHARLESTON, WEST VIRGINIA, ASSIGNORS TO GASOLINE RECOVERY CORPORATION, A CORPORATION OF DELAWARE.

VAPOR RECOVERY.

Application filed June 14, 1926. Serial No. 115,941.

This invention relates to the recovery of vapors from gas mixtures and especially gasoline from natural gas.

By gasoline we mean any volatile petroleum vapors suitable for motor use when blended or unblended with other motor fuel.

By natural gas we mean any gas which has at some time been in contact with petroleum whether in the earth or during the handling of petroleum.

United States Patent No. 1,420,613 discloses one method for the recovery of vapors from gas mixtures by the use of a solid absorbent. Activated charcoal now in common use is suitable for this purpose.

In recovering gasoline from natural gas by activated charcoal we have found that certain methods hereinafter disclosed will increase the yield per million cubic feet of gas treated and at the same time increase the quality of the product produced.

It has been observed repeatedly that the more recoverable gasoline a natural gas contains, the larger amount of gasoline a given mass of charcoal will absorb per cycle. It has also been observed that the quality of the recovered gasoline is always better. For example, natural gas containing only 100 gallons of recoverable gasoline per million cubic feet of gas by test, will usually yield a charcoal saturation of only 6 to 10% per cycle when an attempt is made to "strip" (treat efficiently) the gas. On the other hand, a gas having two thousand gallons per million cubic feet will usually yield a charcoal saturation of twelve to twenty per cent. The recovered product usually has better specifications in the latter case.

It is now well known that charcoal is selective in its absorptive action. Large quantities of vapors are first absorbed and as more of the gas is brought into contact with the charcoal the more volatile vapors are displayed and the less volatile absorbed instead.

The above discussion leads to the conclusion:

The result of the selective action of a charcoal is modified by the quality of the natural gas contacted.

Our process makes use of this principle and consists in taking lean natural gas, that is, natural gas with a gasoline content usually below three hundred gallons per million cubic feet and concentrating the gasoline vapors to be recovered therefrom.

We first pass the natural gas through solid absorbent such as activated charcoal, but stop the passage of natural gas through the charcoal when the selective action of the charcoal has been permitted to function only to a limited degree. The charcoal at this point will contain a large proportion of uncondensable gas which would not be suitable for recovery and sale as natural gasoline. If the selection has been permitted to function for sufficient time, these lighter vapors would mostly have been eliminated and less volatile vapors absorbed instead.

We volatilize the major portion of the absorbed vapors from the charcoal by any known method and cool the volatilized vapors to any desired temperature. In the event that steam is used in the volatilization of the vapors from the charcoal, sufficient cooling would be practiced to condense it from the volatilized vapors. The saturation of the charcoal with readily condensed vapors is preferably less than 3% by weight per cycle. The actual saturation, taking into account the large amount of uncondensable vapor also volatilized, depends upon the gas being treated. This volatilized vapor now contains the fractions of gasoline which it is desirable to recover in a very much more concentrated condition than when they were present in the original natural gas. This concentrated mixture of gas is next passed through a second absorption plant arranged in practically the same manner as the first and the recoverable vapors separated from the gas mixtures as in the known processes.

By this method we are able to both increase the yield of product from the natural gas and the quality of the product produced. By our method we have changed a lean natural gas into a gas mixture containing recoverable vapors in a much more concentrated degree than the original gas and are able to reproduce in a measure the conditions which produced the advantages already discussed. Our process has the disadvantage that it is more expensive to operate, but it has the advantage that a larger yield and a better product are produced.

The accompanying drawing illustrates diagrammatically an apparatus with which the present process may be practiced.

In this drawing, 1 indicates a gas inlet pipe having a valve 2. When this valve is open, the gas may pass into the horizontal absorber 3, which contains a solid absorbent such as active carbon. The denuded gas leaves the absorber by way of pipe 4 which has a control valve 5, and the gas then passes to the gas outlet pipe 6. The passage of the gas through the absorbent is halted when the selective action of the absorbent has been permitted to function only to a limited degree, and then the valves 2 and 5 are closed and the valves 7 and 8 are opened. This permits steam to pass from a boiler 9 through the pipe 10 and into the absorber for volatilizing the vapors from the absorbent, these volatilized vapors and the steam passing out by way of the pipe 11 into a cooler 12, in which the steam is condensed along with some of the hydrocarbon vapors. The mixture of vapors and condensates, then passing into a separator 13 from which the water is discharged by way of pipe 14, the hydrocarbon vapors and condensate continuing on by way of pipe 14ª into a pump or compressor 15. The latter forces these hydrocarbons or the vaporous portion only of the same, through a pipe 16 into a second absorber 17 containing solid absorbent, such as active carbon. In this absorber, the selective action of the absorbent is permitted to eliminate the major portion of the undesirable vapors which pass by way of pipe 18 into the gas outlet pipe 6. When the desired vapors have been lodged in the absorber 17, valves 19 and 20 and 7 are closed, and then the steam may be passed by way of pipe 21 through the absorber 17 to drive the recovered vapors out through pipe 22 and condenser 23 into the separator 24, the latter having a product outlet 25, and a water outlet 26.

In some cases, it may be found that the gas mixture between the absorbers may be richer than necessary to secure the proper selection, and in that event some of the more stable vapor may be condensed and removed before passing the mixture through the next absorber.

During the cooling between the two absorptions some recoverable vapors may be condensed. This condensate as well as the uncondensed vapors may be passed into the second mass of charcoal if desired. Due to the very volatile nature of the uncondensed vapors in the presence of the condensate, this condensate is usually quite volatile.

The descriptive matter hereinbefore given refers particularly to the recovery of natural gasoline. We are aware that the process can be used for the recovery of almost any mixture of hydrocarbon vapors of different volatility from various gaseous mixtures such as hydrocarbons of the benzol series from artificial gases. We do not limit ourselves to the specific examples here given since it is quite apparent that the process has a wider use.

What we claim and desire to secure by Letters Patent is:

1. A process for the recovery of a mixture of hydrocarbon vapors of different volatility from gaseous mixtures which consists in contacting the gaseous mixture with a solid absorbent for insufficient time to permit the selective action of the absorbent to displace a large proportion of the more volatile vapors with less volatile vapors, then volatilizing a substantial portion of the vapors therefrom, then cooling the volatilized vapors to any desired degree, then passing the volatilized vapors through a second solid absorbent in which the selective action of the absorbent is permitted to eliminate the major portion of the undesirable vapors, and vaporizing and condensing a substantial part of the absorbed vapors from the second absorbent.

2. A process for the recovery of a mixture of hydrocarbon vapors of different volatility from natural gas which consists in contacting the natural gas with activated charcoal for insufficient time to permit the selective action of the absorbent to displace a large proportion of the more volatile vapors with less volatile vapors, then volatilizing a substantial portion of the vapors therefrom, then cooling the volatilized vapors to any desired degree, then passing the volatilized vapors through a second mass of activated charcoal in which the selective action of the charcoal is permitted to eliminate the major absorbent is permitted to eliminate the major portion of the undesirable vapors, and vaporizing and condensing a substantial part of the absorbed vapors from the second absorbent.

3. A process for the recovery of natural gasoline from natural gas which consists in contacting the natural gas with a solid absorbent for insufficient time to permit the selective action of the absorbent to displace a large proportion of the more volatile vapors with less volatile vapors, then volatilizing a substantial portion of the vapors therefrom, then cooling the volatilized vapors to any desired degree, then passing the volatilized vapors through a second absorbent in which the selective action of the absorbent is permitted to eliminate the major portion of the undesirable vapors, and vaporizing and condensing a substantial part of absorbed vapors from the second absorbent.

4. A process for the recovery of natural gasoline from natural gas which consists in flowing natural gas in contact with activated charcoal, stopping the flow when the activated charcoal still contains a large portion of undesirable vapors, then volatilizing a substantial portion of the vapors therefrom, then cooling the volatilized vapors to any desired degree, then passing the volatilized vapors through a second mass of activated charcoal in which the selective action of the absorbent is permitted to eliminate the major portion of the undesirable vapors, and vaporizing and condensing a substantial part of absorbed vapors from the second absorbent.

5. A process for the recovery of natural gasoline from natural gas which consists in flowing natural gas in contact with activated charcoal, stopping the flow when the activated charcoal contains less than three percent by weight of desirable natural gasoline vapors, then volatilizing a substantial portion of the vapors therefrom, then cooling the volatilized vapors to any desired degree, then passing the volatilized vapors through a second mass of activated charcoal in which the selective action of the absorbent is permitted to eliminate the major portion of the undesirable vapors, and vaporizing and condensing a substantial part of absorbed vapors from the second absorbent.

In testimony whereof we affix our signatures.

CLYDE L. VORESS.
NELSON C. TURNER.